United States Patent
Huang et al.

(10) Patent No.: US 7,753,519 B2
(45) Date of Patent: Jul. 13, 2010

(54) TEMPLES FOR EYEGLASSES

(75) Inventors: Su-Han Huang, Tainan (TW);
Hsin-Feng Lin, Tainan (TW)

(73) Assignee: High Rainbow Enterprise Co., Ltd., Tainan (TW)

( * ) Notice: Subject to any disclaimer, the term of this patent is extended or adjusted under 35 U.S.C. 154(b) by 0 days.

(21) Appl. No.: 12/232,192

(22) Filed: Sep. 12, 2008

(65) Prior Publication Data
US 2010/0033674 A1    Feb. 11, 2010

(30) Foreign Application Priority Data
Aug. 7, 2008    (TW) .............................. 97130138 A

(51) Int. Cl.
*G02C 5/14* (2006.01)
(52) U.S. Cl. ...................................... 351/121; 351/123
(58) Field of Classification Search ................. 351/111, 351/119, 121, 123
See application file for complete search history.

(56) References Cited
U.S. PATENT DOCUMENTS
7,490,935 B1 *    2/2009    Vallee et al. ................. 351/122
* cited by examiner Primary Examiner—Huy K Mai
(74) Attorney, Agent, or Firm—Rosenberg, Klein & Lee

(57) ABSTRACT

This invention relates to temples for eyeglasses each comprising a main temple body and an accessory part. The accessory part at each side has a side plate provided with an embracing portion turning at the rear end thereof and further extending forward. An inserting portion is provided on the side plate near the embracing section. The main temple body at each side has an engaging section at its end, and an engaging slot which is carved to be hollow is provided at a place near the engaging section of the main temple body. In this manner, the side plate of the accessory part and the embracing section embrace the engaging section of the temple body, and the inserting portion of the accessory-part is inserted and interlinked within the engaging slot such that a stable assembling state is accomplished between the main temple body and the accessory part. In addition, the rear end of the main temple body is entirely embraced by the accessory part so as to raise the snugness of wearing, furthermore to facilitate and smoothen the assembling between the temple body and the accessory-part. Besides, replacement for new accessory parts can be conducted according to practical demands in a more convenient manner.

12 Claims, 14 Drawing Sheets

TEMPLES FOR EYEGLASSES

BACKGROUND OF THE INVENTION

1. Field of the Invention

The present invention relates to the temples for eyeglasses, especially to the temples for eyeglasses in a stable assembled state between its main temple body and accessory part, and the temple bodies are embraced entirely by the accessory parts at the rear ends thereof so as to raise the wearing snugness, furthermore to facilitate and smoothen the assembling between the main temple bodies and the accessory parts. Besides, replacement of accessory-parts can be conducted according to practical demand in a more convenient manner.

2. Brief Description of the Prior Art

The purpose of wearing eyeglasses, in addition to the basic purpose of vision correction, eye protection in working and protection from ultraviolet light radiation in leisure or sport time are also appreciated, even simply for aesthetic or fashion values is not rare.

Generally, temple sleeves are preferably provided at the rear ends of temples of eyeglasses for the purpose of wearing snugness and stability. The temple sleeve provides better touch feeling, snugness and non-slip property when contacting with a wearer's face. The attachment method of the temple sleeves is substantially divided into four technologies.

For the first technology, the temple sleeve is injected as a whole to embrace the temple simultaneously with the injection molding of the temple. This technology can be referred to Taiwanese New Utility Model No. 87214099 entitled as "Eyeglasses Structure", and No. 92215893 entitled as "Eyeglasses Temples". However, it will cause the temple sleeve inseparable from the temple. The appearance and color is almost settled at the initial injection-molding stage, hence replacement thereof is nearly impossible.

For the second technology, the temple sleeve (5) is a hollow part which is directly put around the rear end of the temple (6), as shown in FIG. 13. The temple sleeve (5) in this technology shows bigger area embracement around the temple, but has the following dilemma in practical applications. In consideration of the factor to avoid the departing of the temple sleeve (5) from the temple (6), the inner diameter of the hollow bore (51) should have a tight fit to the rear end of the temple (6) such that the insertion of the temple sleeve (5) onto the temple (6) might become very difficult. On the other hand, in considering the factor for easy assembling, the inner diameter of the hollow bore (51) should have a looser fit to the rear end of the temple (6) such that the temple sleeve (5) is apt to depart from the temple (6). Additionally, the rear end of the temple (6) is often made to be narrow and thin so that the temple (6) is easily broken or damaged due to improper force application during insertion operation of the temple sleeve.

For the third technology, the temple sleeve (5) is a hollow part which is directly put around the rear end of the temple (6), and an interlinking means is provided between the temple sleeve and the temple. This technology can be referred to Taiwanese New Utility Model No. 78201698 entitled as "Addendum I of Improved Interlinking Structure between Temple and Temple Sleeve", Taiwanese New Utility Model No. 90221241 entitled as "Improvement on Combination of Metalized Temple and Flexible Temple Sleeve" and Taiwanese New Utility Model No. 96204181 entitled as "Temples of Eyeglasses". In the above prior art, the interlinking means is utilized to prevent the temple sleeve from stripping off the temple; however, it is designed as a stop block protruded from the temple body which causes the insertion of the temple sleeve onto the temple become even harder.

For the fourth technology, referring to FIG. 14, a through hole (71) is provided on the temple (7) and a flexible element (72) is assembled in the through hole (7). This assembling method is convenient, but the rear end of the temple (7) is not embraced by the flexible element (72). Therefore, this technology cannot provide satisfactory wearing snugness.

SUMMARY OF THE INVENTION

The main object of the present invention is to provide temples for eyeglasses in which each temple comprises a main temple body and an accessory part. The accessory part made of soft material is combined with the main temple body, then the rear end of the temple is embraced by the accessory part and the portion of the temple contacted with a wear's face is protected by the accessory part of soft material, the most area of which included in the temple, so as to enhance the snugness during wearing. Furthermore, the method of assembling between the main temple body and the accessory part can provide not only the easiness and convenience for assembling, but also the engagement force applied therebetween is very stable. Replacement for new accessory parts can be conducted according to practical demands in a more convenient manner.

In order to achieve above object, the temple in the present invention comprises a main temple body and an accessory part. The accessory part of each temple has a side plate provided with an embracing portion turning and extending from the rear end of the side plate. An inserting portion is consecutively provided on the side plates near the embracing portion. The main temple body has an engaging section at its rear end, and an engaging slot which is carved to be hollow is provided at a place near the engaging section of the main temple body. In this manner, the side plate of the accessory part and the embracing portion embrace the engaging section of the main temple body, and the inserting portion of the accessory part is inserted and interlinked within the engaging slot of the main temple body such that a stable assembling state is accomplished between the main temple body and the accessory part.

BRIEF DESCRIPTION OF THE DRAWINGS

The present invention will be better understood by referring to the accompanying drawings, wherein.

DETAILED DESCRIPTION OF THE PREFERRED EMBODIMENTS

The objects, the technical contents and the expected effectiveness of the present invention will become more apparent from the detailed description of the preferred embodiment in conjunction with the accompanying drawings.

Figure 1:
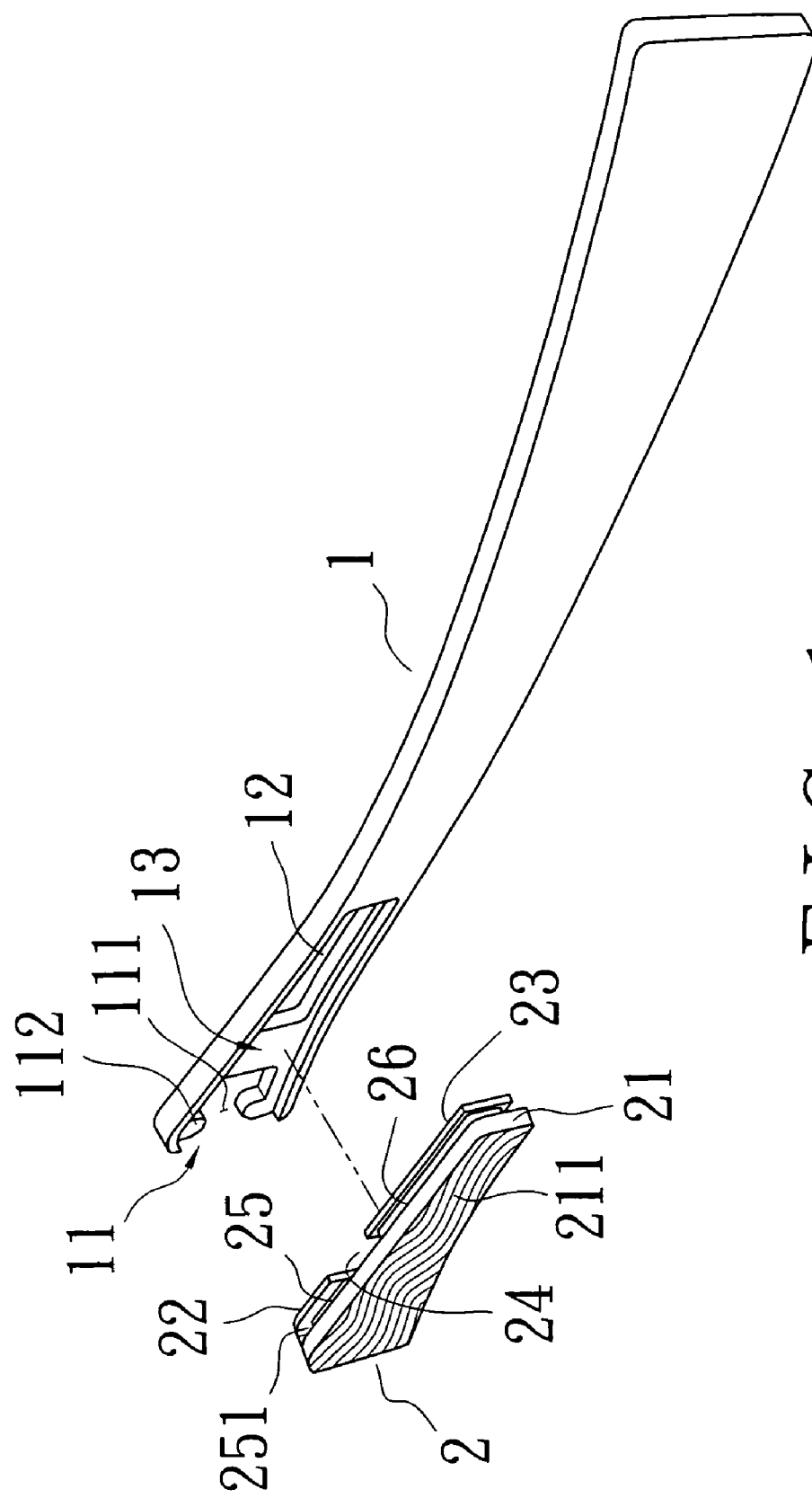
FIG. 1 is a perspective exploded view showing the first embodiment of the temples for eyeglasses of the present invention.
Figure 2:
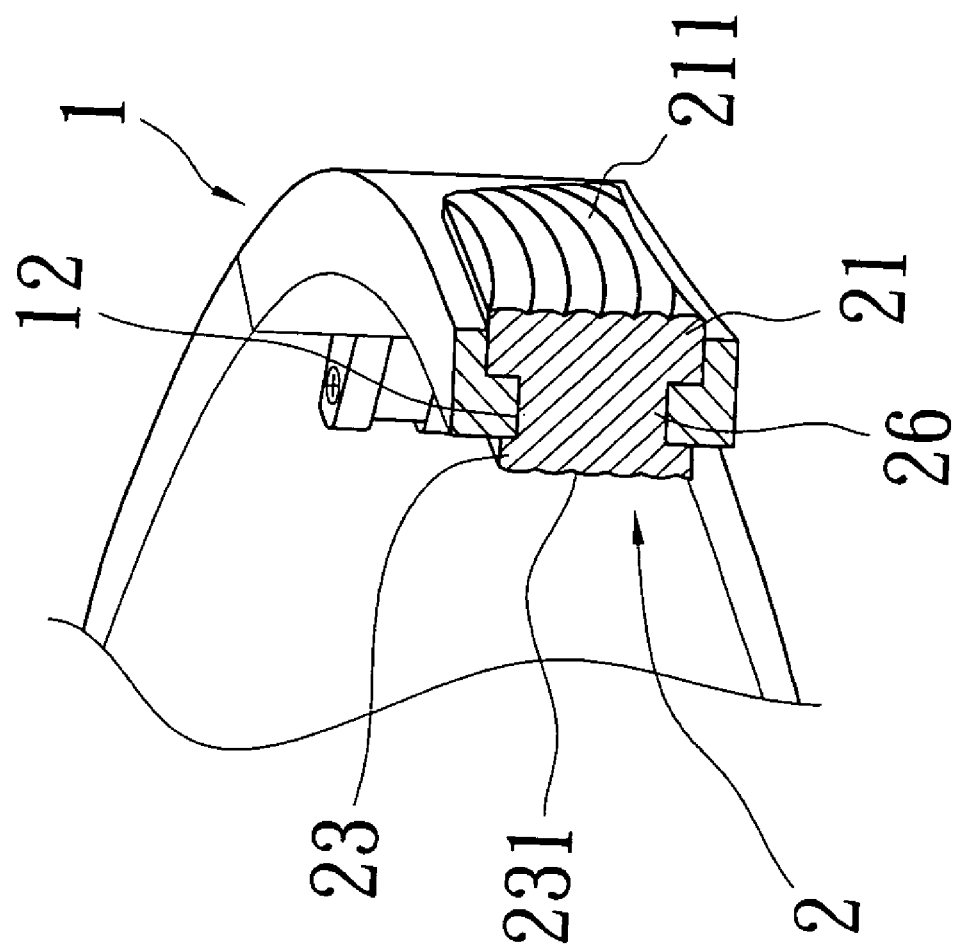
FIG. 2 is a sectional view of the end portion of the temple body of FIG. 5 showing the engagement of the accessory part with the engagement slot for eyeglasses of the present invention.
Figure 5:
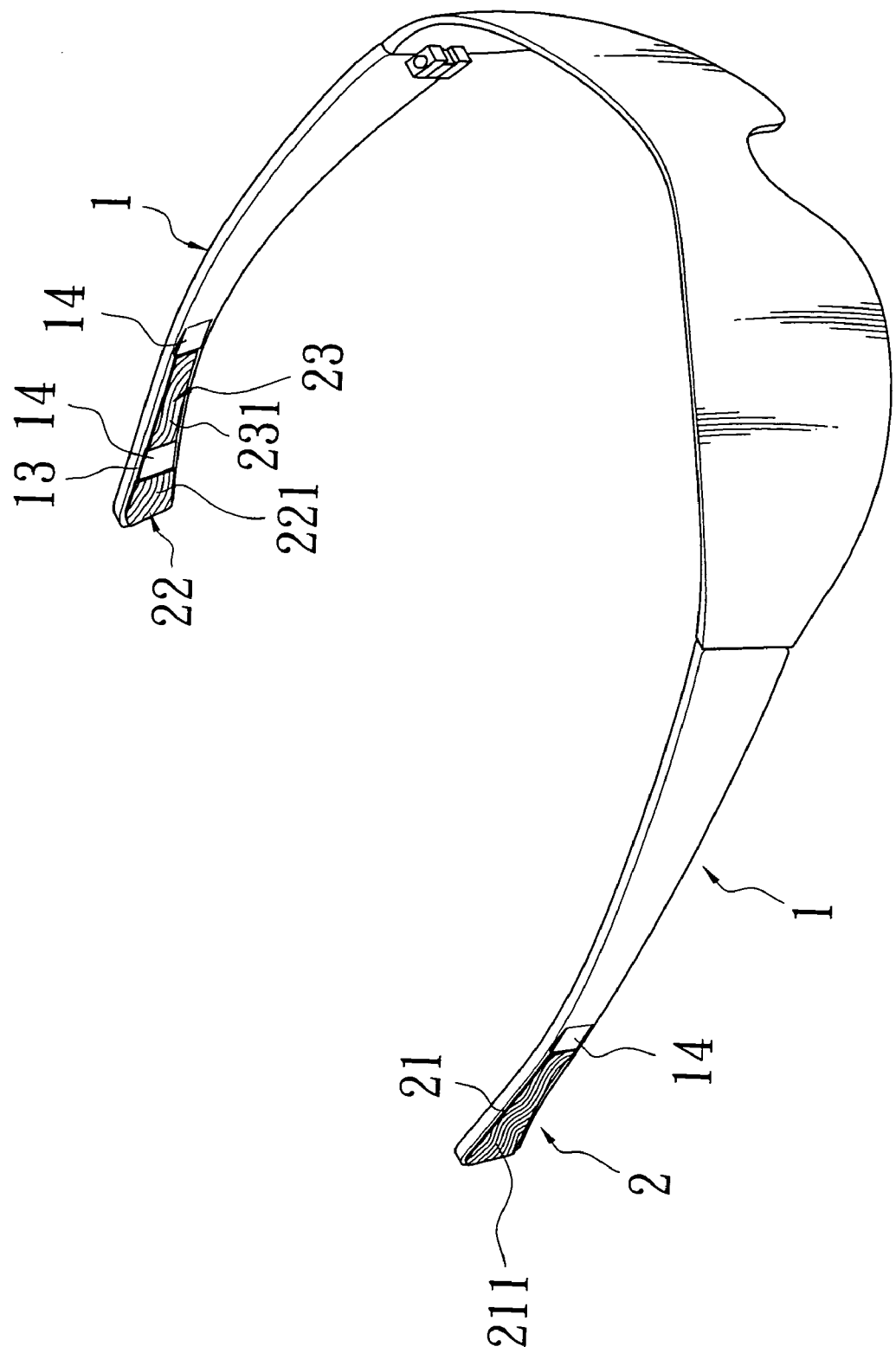
FIG. 5 is a perspective assembled view showing the first embodiment of the temples for eyeglasses of the present invention combined with a frame.

Referring to FIGS. 1 and 5 showing the first embodiment of the present invention, the temple comprises a main temple body (1) and an accessory part (2).

Basically, as the eyeglass temples are mirror images with each other, the following description will be focused on one side only. The main temple body (1) is provided with an engaging section (11) at its rear end which has an opening (111). Protrusions (112) opposite to each other are provided respectively on the upper and lower sides of the opening (111). An engaging slot (12) is formed in a hollow manner at a place near the engaging section (11) of the main temple body (1). The engaging section (11) and the engaging slot (12) are spaced apart by a connecting section (13).

The accessory part (2) has a side plate (21) which is provided with an embracing portion (22) turning at the rear end thereof and further extending forward. An abutting portion (23) is fitted on the side plate (21) and at a place adjacent to the embracing portion (22). A sinus (24) is formed between the embracing portion (22) and the abutting portion (23). A first inserting portion (25) having a cross sectional area smaller than that of the embracing portion (22) is connected between the side plate (21) and the embracing portion (22). Similarly, a second inserting portion (26) having a cross sectional area smaller than that of the abutting portion (23) is connected between the side plate (21) and the abutting portion (23). Further, grooves (251) for engagement are provided respectively on the upper and lower sides of the rear end of the first inserting portion (25).

Referring to FIGS. 2 to 5, when assembled, the two engaging protrusions (112) of the engaging section (11) at the rear end of the main temple body (1) are correspondingly inserted into the grooves (251) of the first inserting portion (25) on the accessory part (2), and the first inserting portion (25) is inserted and retained within the opening (111) of the engaging section (11). Furthermore, the second inserting portion (26) of the accessory part (2) is inserted and retained within the engaging slot (12) of the main temple body (1), and the peripheral edge of the abutting portion (23) is snugly fitted on the other face of the main temple body (1) so that the accessory part (2) can be assembled on the temple body (1) stably.

In this manner, the rear end of the temple body (1) is embraced by the embracing portion (22) of the accessory part (2) and the abutting portion (23) is projected from the surface of the main temple body (1), such that better snugness can be obtained by a user wearing the eyeglasses having the temples of the present invention.

Figure 3:
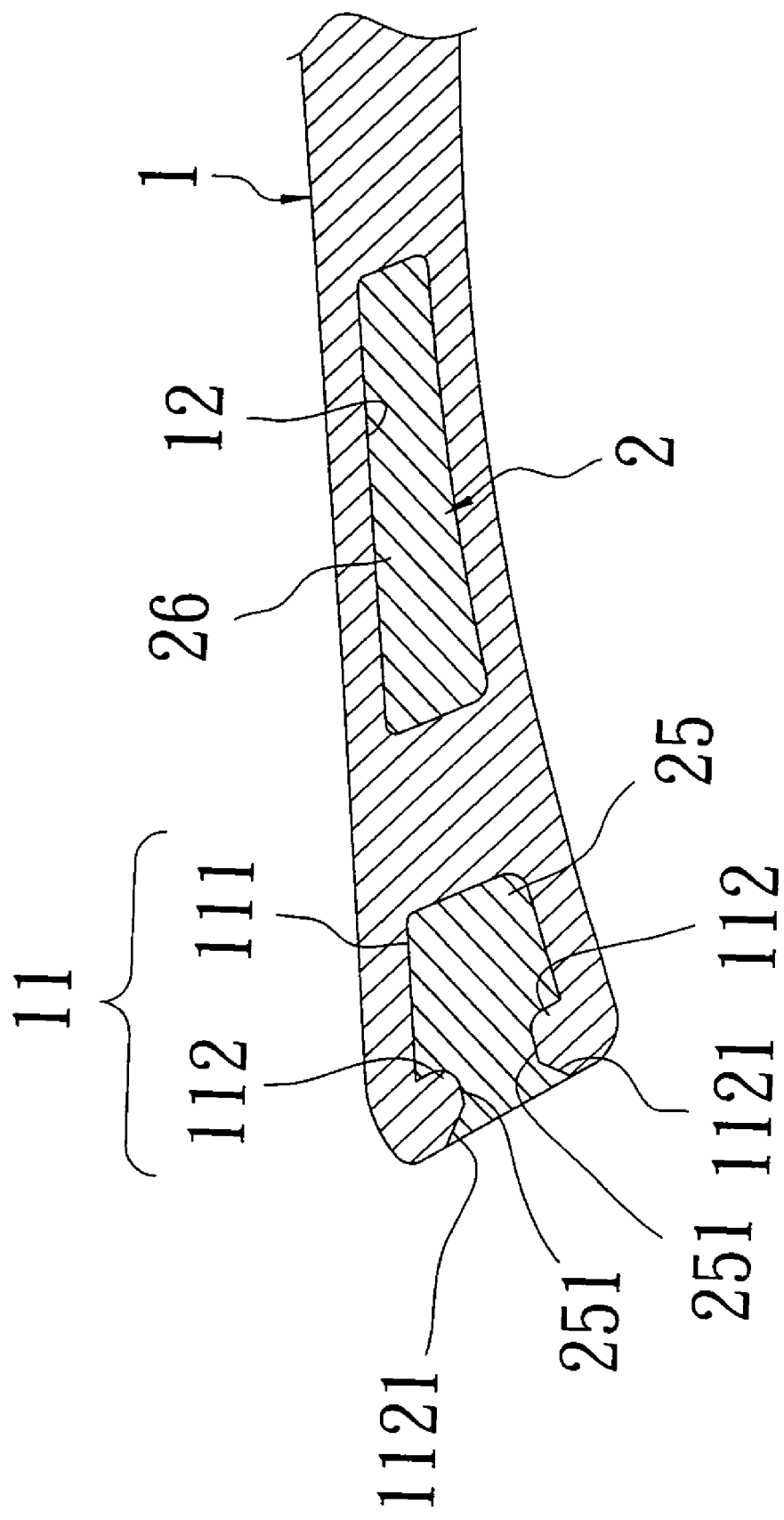
FIG. 3 is an assembled sectional side view showing the first embodiment of the temples for eyeglasses of the present invention.

Furthermore, guiding chamfers (1121) are provided at the rear end edges of the protrusions (112) on the engaging section (11) of the main temple body (1) of the present invention, as shown in FIG. 3, so that the sliding, of the protrusions (112) into the grooves (251) of the accessory-part (2) can be facilitated.

Moreover, the end face of the side plate (21) of the accessory-part (2) of the present invention is formed as a decorative face (211) which can be formed with a decorative design or pattern. Similarly, the embracing portion (22) and the abutting portion (23) of the accessory part (2) can also be formed with decorative surfaces (221) and (231) having decorative designs and patterns, as shown in FIG. 5.

Figure 4:
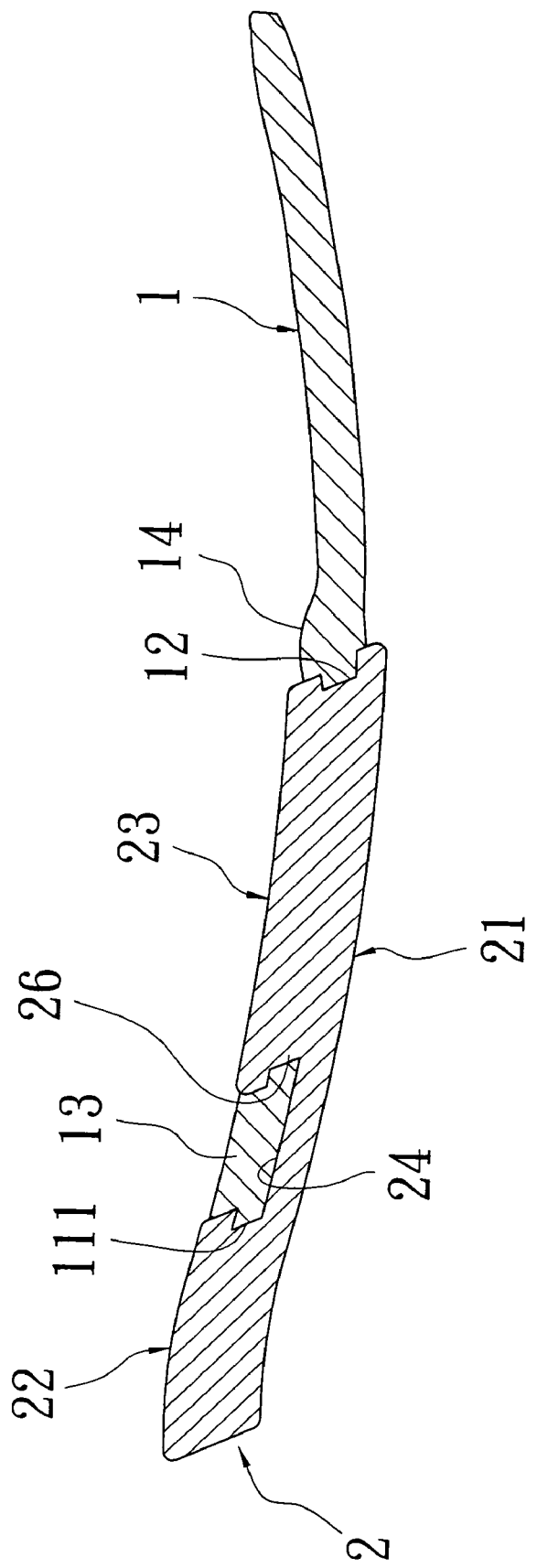
FIG. 4 is an assembled sectional top view showing the first embodiment of the temples for eyeglasses of the present invention.

Moreover, a projecting section (14) is projected from the inner surface of the main temple body (1), from a place adjacent to the engaging section (12) and/or from the inner wall surface of the connecting section (13), as shown in FIGS. 4 and 5. The provision of the projecting sections (14) is to conform to the level of the embracing portion (22) and the abutting portion (23) of the accessory-part (2) assembled on the temple body (1) so as to prevent the embracing portion (22) and the abutting portion (23) from entrapping or pulling a user's hair.

Figure 6:
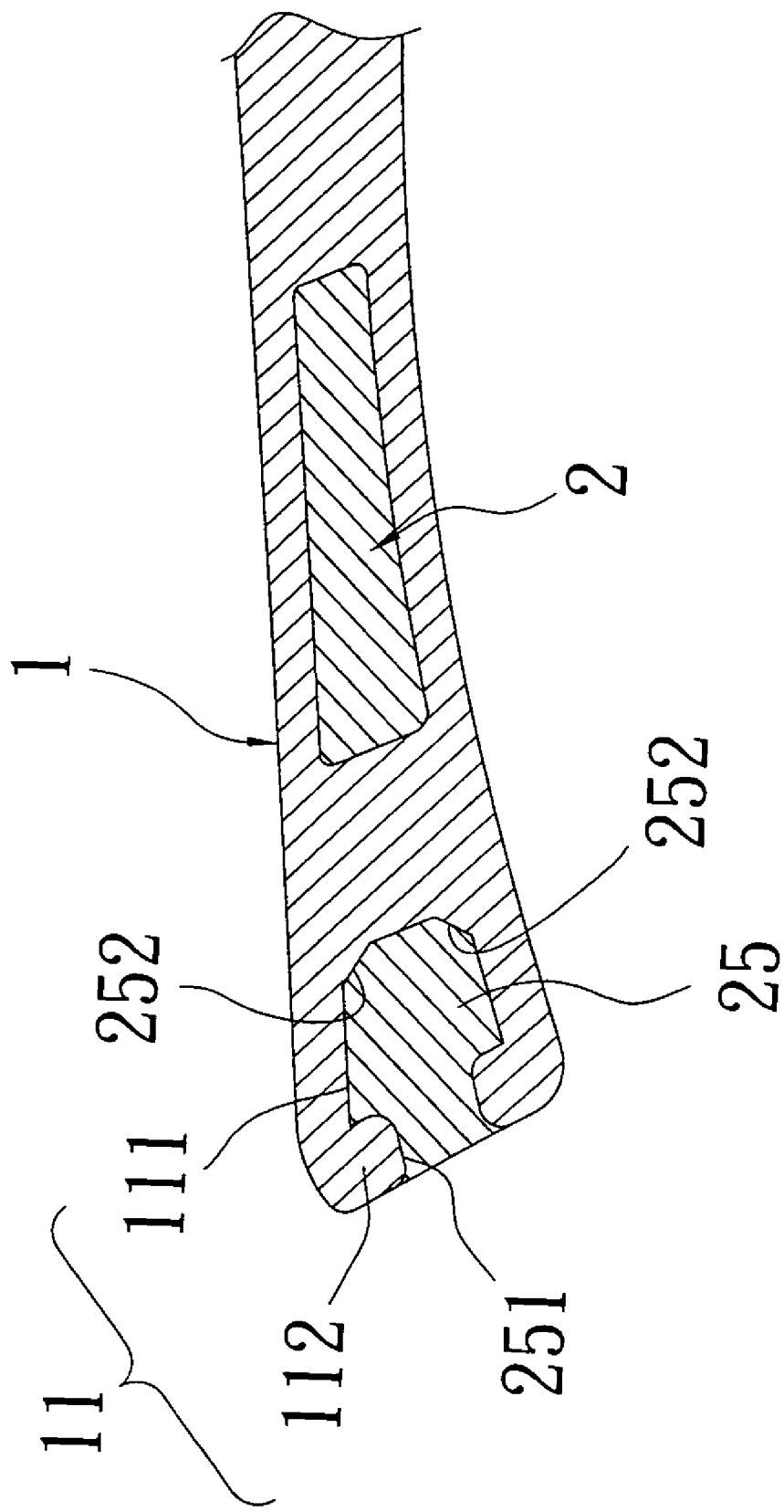
FIG. 6 is an assembled sectional side view showing the second embodiment of the temples for eyeglasses of the present invention.

Referring to FIG. 6 showing the second embodiment of the present invention, guiding chamfers (252) are provided at the upper and lower corners of one end of the first inserting portion (25), which contact with the main temple body (1) during assembling, of the accessory part (2), so as to enhance the easiness of the combination of the main temple body (1) with the accessory part (2) during assembling.

Figure 7:
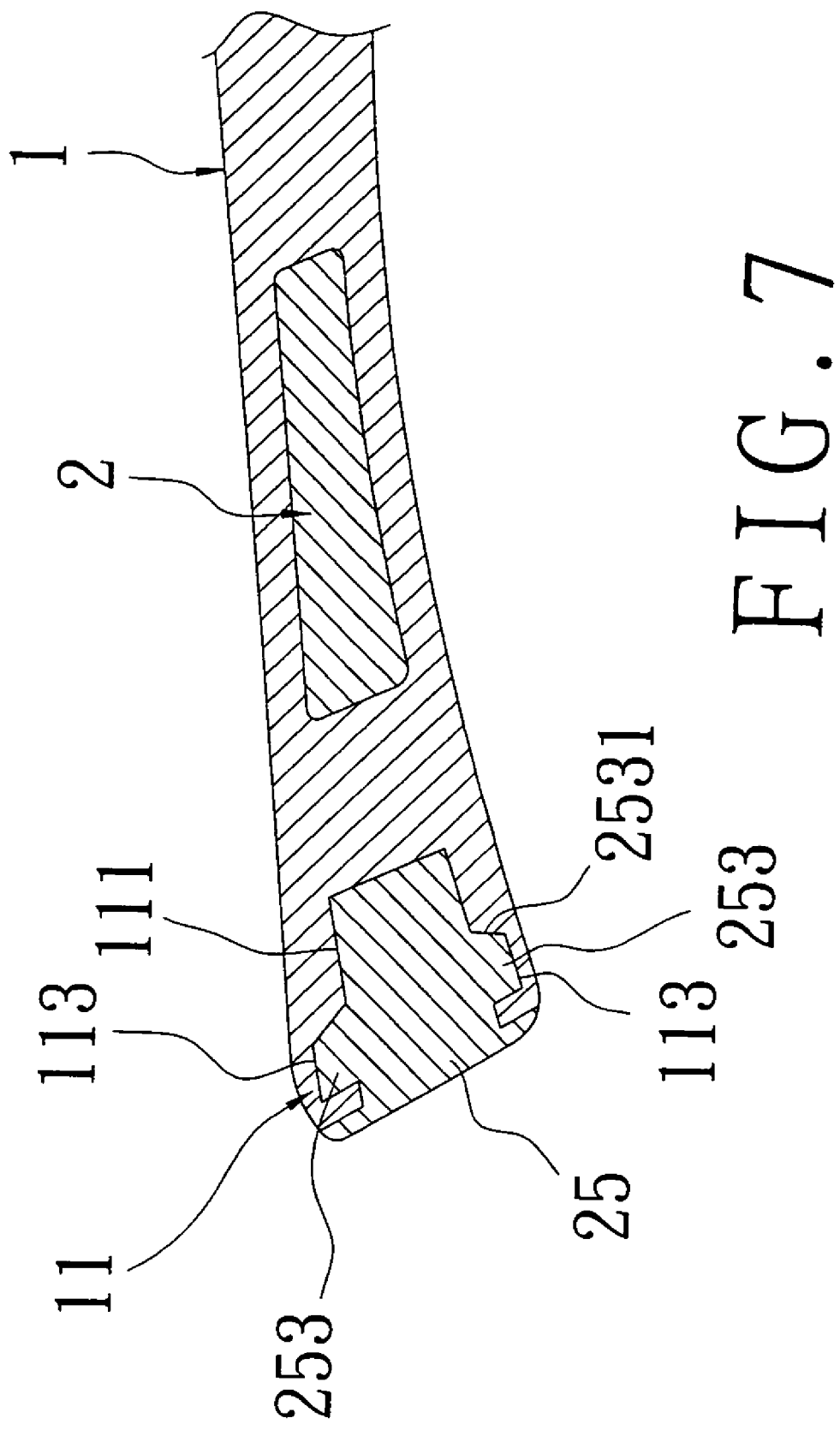
FIG. 7 is an assembled sectional side view showing the third embodiment of the temples for eyeglasses of the present invention.

Further referring to FIG. 7 showing the third embodiment of the present invention, the main temple body (1) is provided with grooves (113) on the upper and lower sides of the opening (111) of the engaging section (11), and protrusions (253) are correspondingly provided on the upper and lower sides of one end of the first inserting portion (25) of the accessory part (2). The protrusions (253) at the end of the accessory part (2) are thus interlinked with the grooves (113) of the main temple body (1). Moreover, guiding chamfers (2531) are provided at the upper and lower corners of the end of the protrusions (253), which is inserted into the main temple body (1) first during assembling, so as to enhance the easiness of the combination of the main temple body (1) with the accessory-part (2) during assembling.

Figure 8:
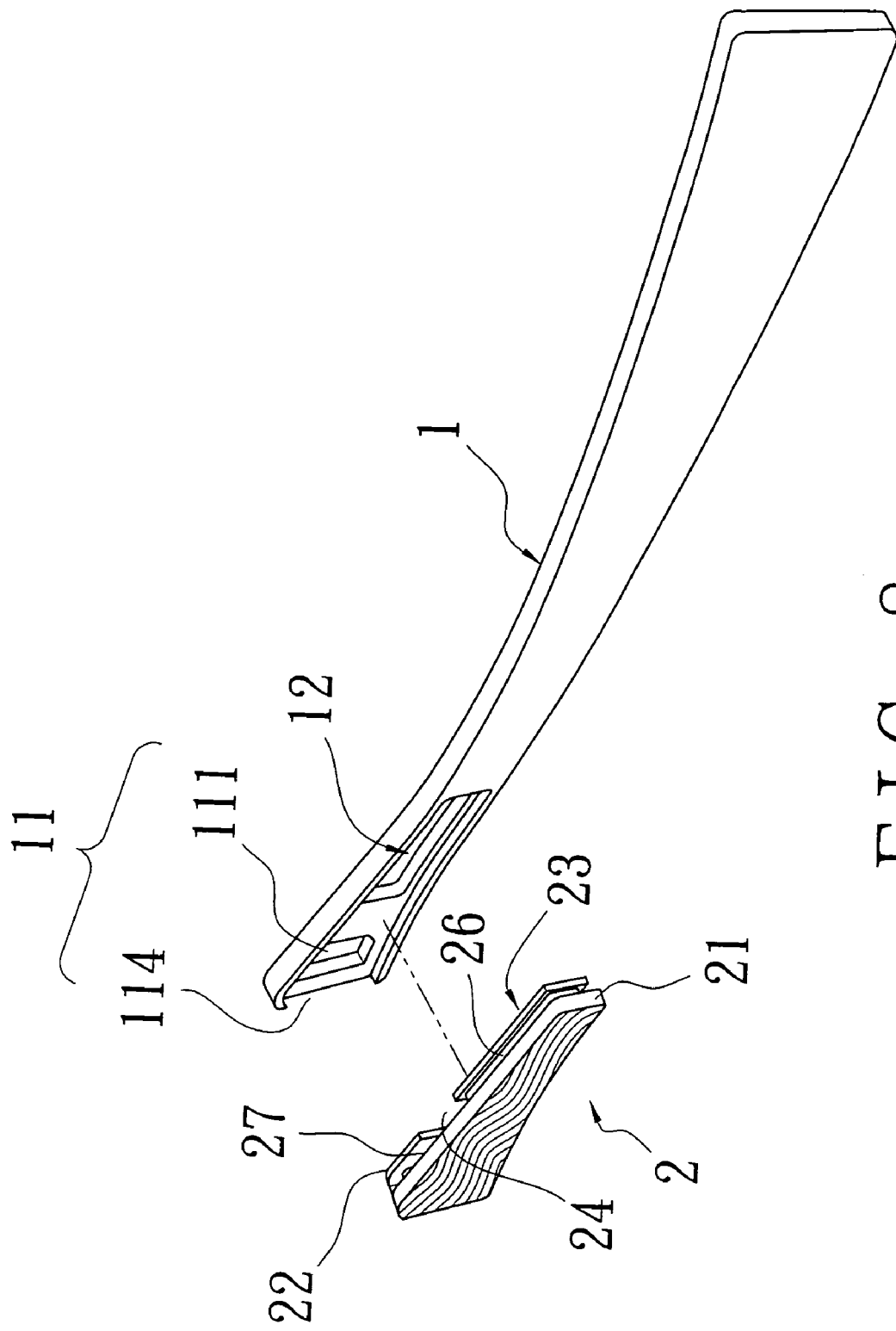
FIG. 8 is a perspective exploded view showing the fourth embodiment of the temples for eyeglasses of the present invention.
Figure 9:
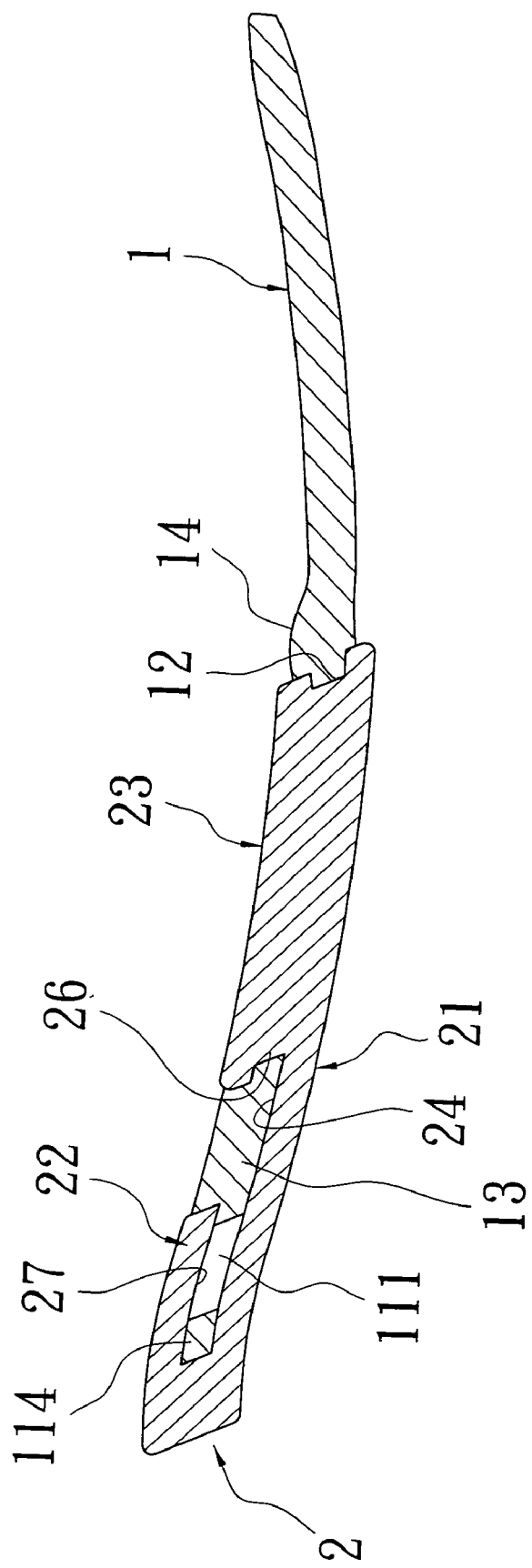
FIG. 9 is an assembled sectional top view showing the fourth embodiment of the temples for eyeglasses of the present invention.

FIGS. 8 and 9 depict the fourth embodiment of the present invention. The main difference between this embodiment and the first embodiment is that the engaging section (11) at the rear end of the main temple body (1) has an opening (111) and a post section (114) connected between the upper and lower end faces of the opening (111), and a slit (27) for interlinking with the post section (114) is provided between the side plate (21) and the embracing portion (22) of the accessory part (2).

Figure 10:
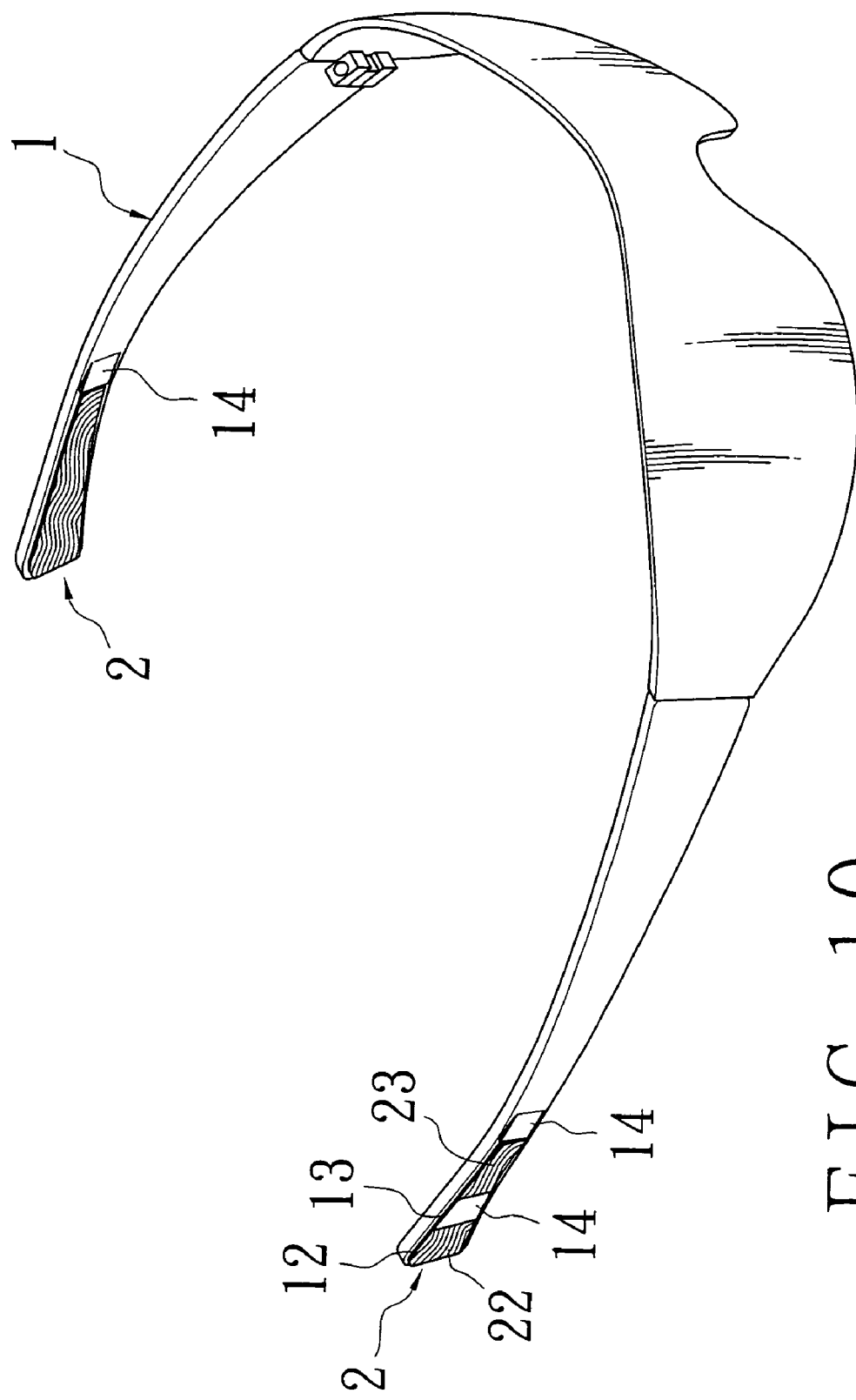
FIG. 10 is a perspective assembled view showing the fifth embodiment of the temples of eyeglasses of the present invention.

The accessory part (2) in the abovementioned embodiments is combined with main temple body (1) from the outside of main temple body (1). As shown in FIG. 10 showing the fifth embodiment of the present invention, the accessory part (2) in the abovementioned embodiments is, however, combined with main temple body (1) from the inside of main temple body (1). In this embodiment, projecting sections (14) are also projected from the outer surface of the main temple body (1), from a place adjacent to the engaging section (12) and/or from the outer wall surface of the connecting section (13).

Figure 11:
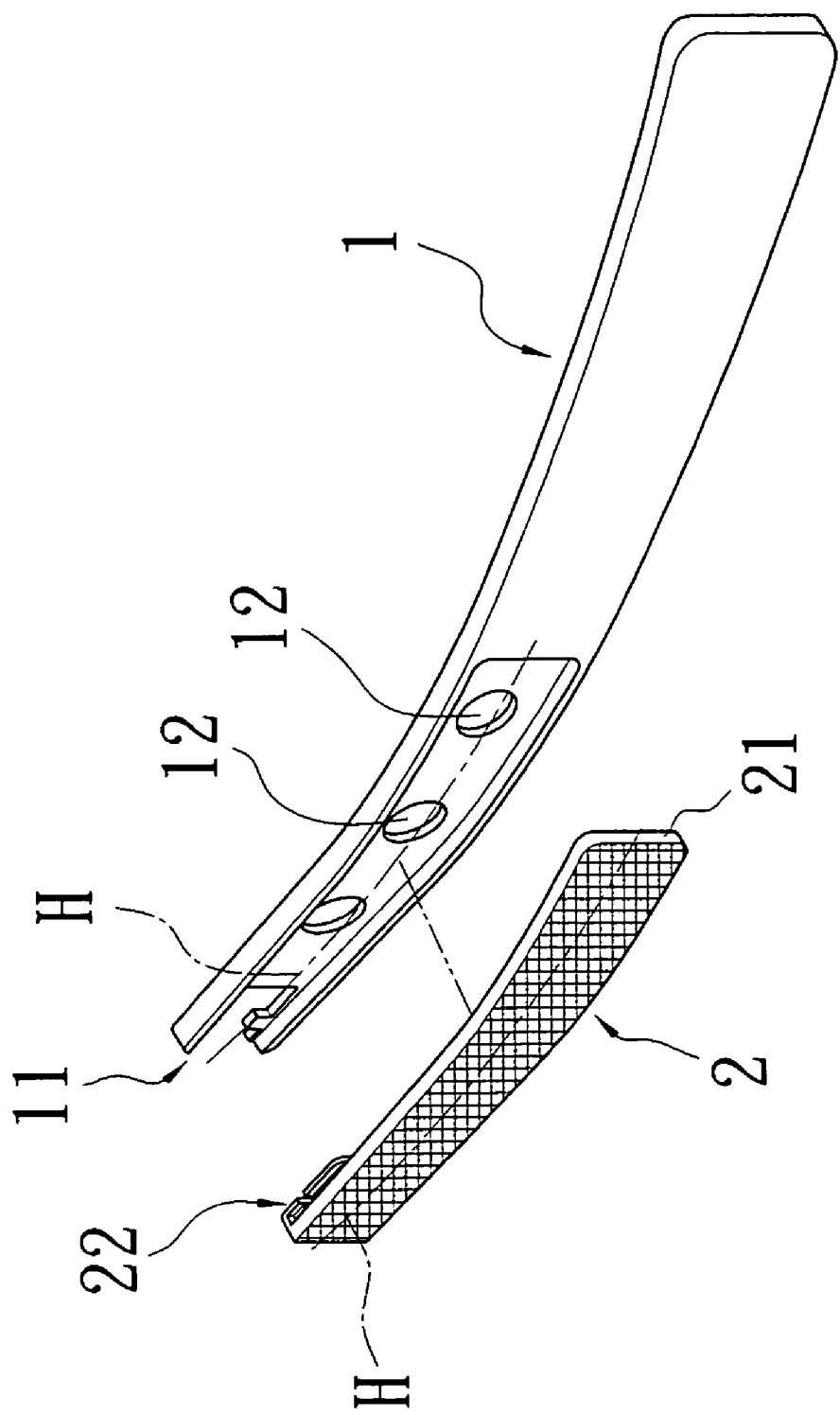
FIG. 11 is a first perspective exploded view showing the sixth embodiment of the temples for eyeglasses of the present invention.
Figure 12:
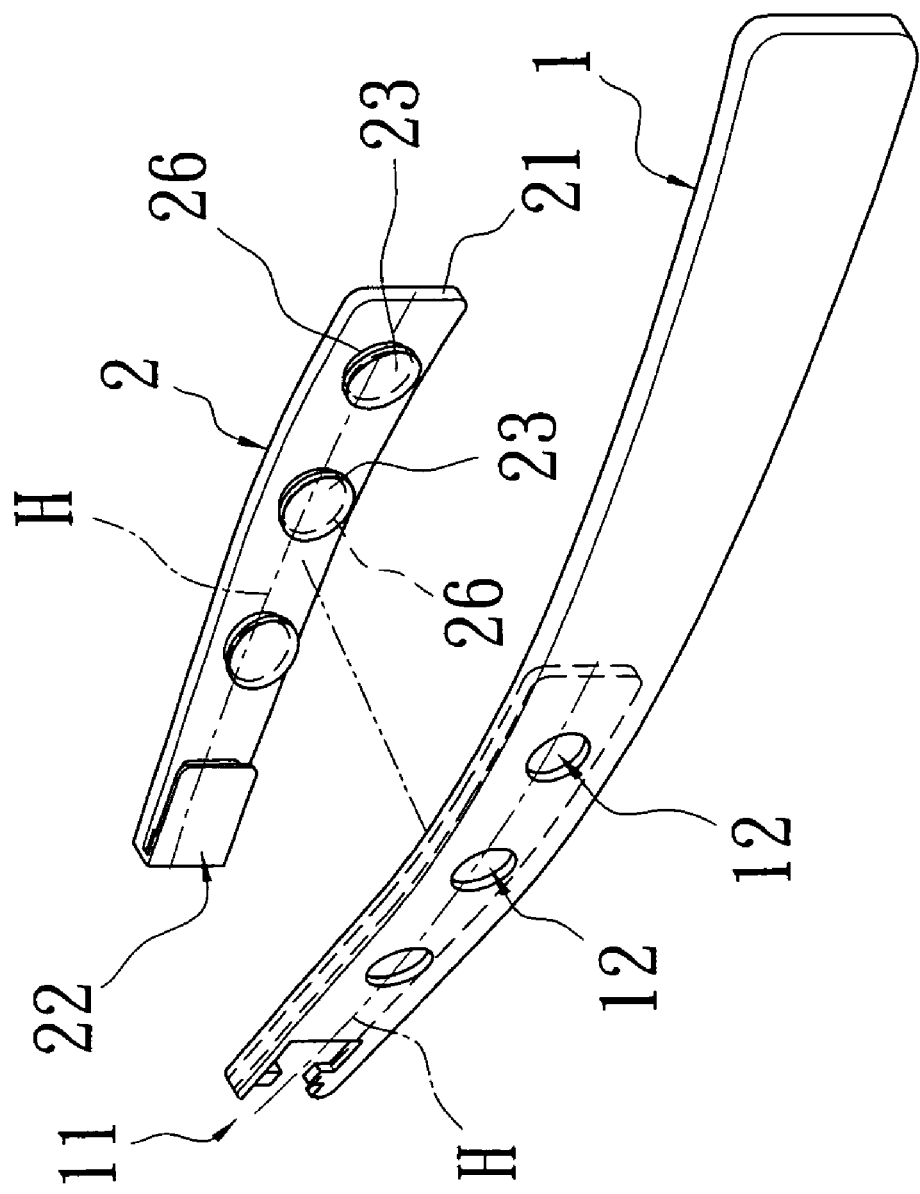
FIG. 12 is a second perspective exploded view showing the sixth embodiment of the temples of eyeglasses of the present invention.
Figure 13:
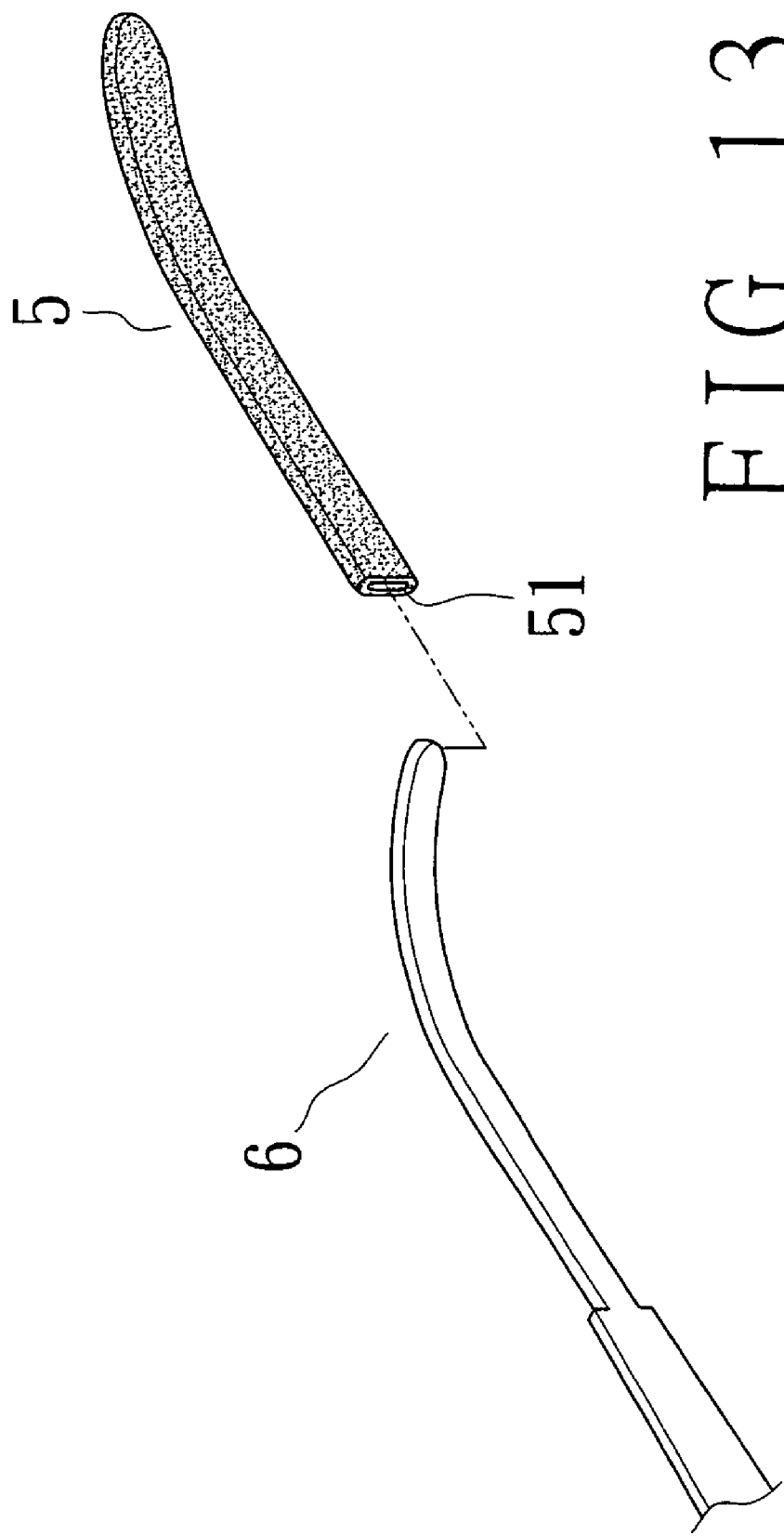
FIG. 13 is a view showing the conventional temples for eyeglasses.
Figure 14:
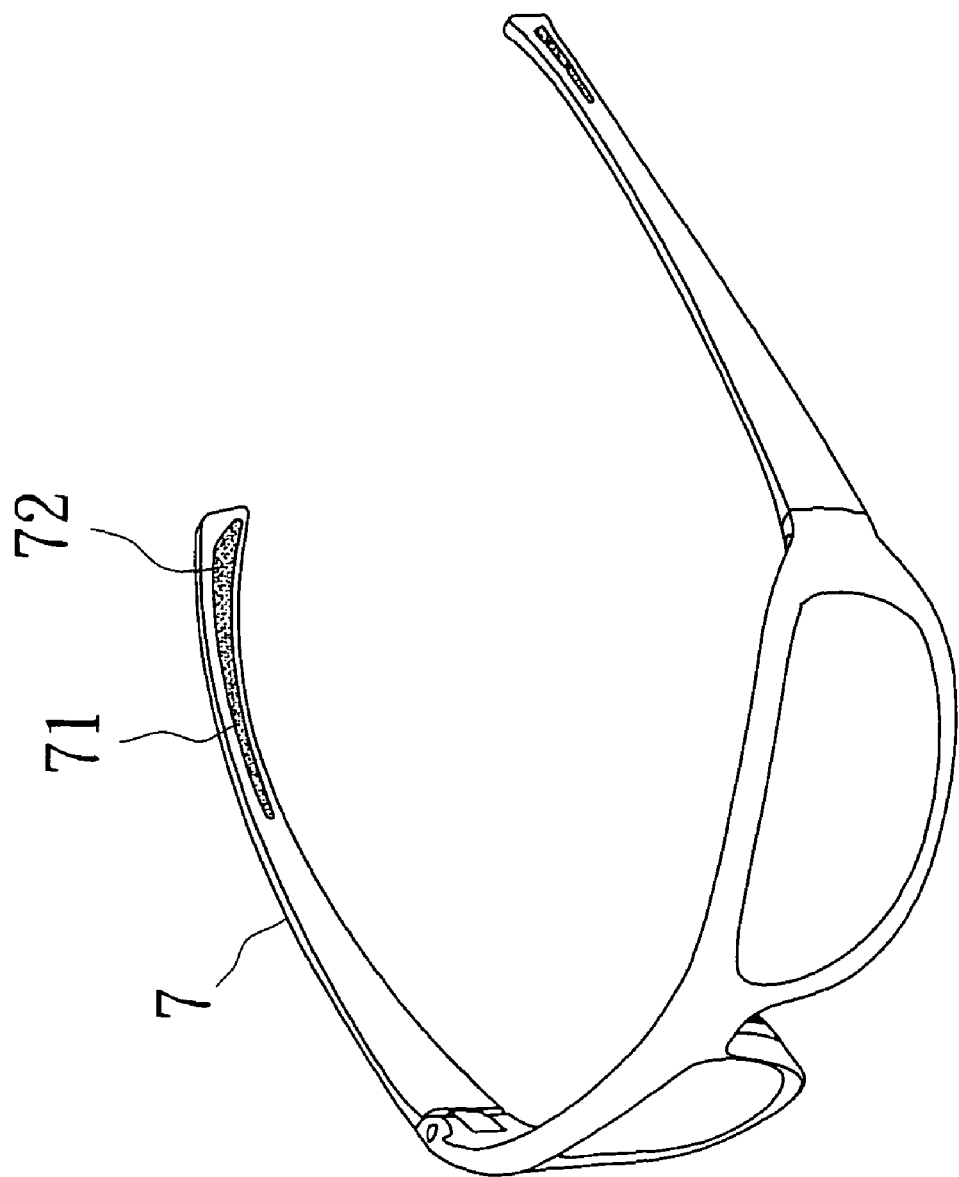
FIG. 14 is another view showing the conventional temples for eyeglasses.

As shown in FIGS. 11 and 12 showing the sixth embodiment of the present invention, the engaging slot (12) of the main temple body (1) is designed to have the horizontal centerline (H) as the centerline of symmetry of its shape. Similarly, the second inserting portion (26) of the accessory part 2 is also designed to have the horizontal centerline (H) as the centerline of symmetry of its shape. In this manner, the accessory part (2) can be combined with the main temple body (1) either from the outside or from the inside of the temple body (1) so as to obtain the function of style or fashion transformations. Further, the number of the engaging slot (12) on the main temple body (1) can be one or more, while the number of the second inserting portion (26) is provided correspondingly with respect to the number of the engaging slot (12) on the main temple body (1).

Based on the foregoing, the eyeglass temples of the present invention has at least several advantages listed as follow:

1. After the combination of the accessory part and the main temple body of the present invention, the snugness of an user's wearing the eyeglasses will be enhanced, as the accessory part embraces the whole rear end of the temple body and the accessory part is made of soft material. Furthermore, the technique of the combination between the main temple body and the accessory part of the present invention is obtained by the method of insertion and retention. Therefore, it is more convenient either in assembling or disassembling.

2. As the embracing portion of the accessory part embraces the overall rear end of the main temple body and additionally the inserting portion and the abutting portion of the accessory-part are respectively inserted and retained into the engaging section and the engaging slot, the engagement force applied between the main temple body and the accessory part of the present invention is very strong and thus the interlinking therebetween is significantly stable.

3. Since a detachably assembling method is utilized between the main temple body and the accessory part of the present invention, replacement for new parts or new types can be conducted according to practical demands. In this manner, the eyeglass temples can present various unique appearance, hence the business benefits can be enhanced.

What is claimed is:

1. An eyeglass temple, comprising:
a main temple body (1) having an engaging section (11) at its rear end, at least one engaging slot (12) being formed at a place near said engaging section (11), said engaging section (11) and said engaging slot (12) being spaced apart by a connecting section (13), said engaging section (11) having an opening (111), protrusions (112) opposite to each other being provided respectively on an upper side and a lower side of said opening (111);
an accessory part (2), being used to combine with said main temple body (1), having a side plate (21) fitted with an embracing portion (22) to turn at the end thereof and further extending forward, said embracing portion (22) being used to interlink correspondingly with said engaging section (11) of said main temple body (1), a second inserting portion (26) being fitted at a place adjacent to said embracing portion (22) and on said side plate (21) for interlinking correspondingly with said engaging slot (12) provided on said temple body (1), a sinus (24) being formed between said embracing portion (22) and said second inserting portion (26) for accommodating said connecting section (13), a first inserting portion (25) being fitted between said side plate (21) and said embracing portion (22) for insertion into said opening (111), and grooves (251) for engagement being provided respectively at an upper side and a lower side of one end of said first inserting portion (25) for interlinking with said protrusions (112).

2. An eyeglass temple as claimed in claim 1, wherein projecting sections (14) are formed on the inner surface of said main temple body (1) and on a place adjacent to said engaging section (12), or on the inner surface of said connecting section (13).

3. An eyeglass temple as claimed in claim 1, wherein said engaging slot (12) having a horizontal centerline (H) as the centerline of symmetry of its shape and said second inserting portion (26) having a horizontal centerline (H) as the centerline of symmetry of its shape, so that the accessory part (2) is combined with said main temple body (1).

4. An eyeglass temple as claimed in 3, wherein projecting sections (14) are provided on the inner surface of said main temple body (1) and on a place adjacent to said engaging section (12), or on the inner surface of said connecting section (13).

5. An eyeglass temple, comprising:
a main temple body (1) having an engaging section (11) at its rear end, at least one engaging slot (12) being formed at a place near said engaging section (11), said engaging section (11) and said engaging slot (12) being spaced apart by a connecting section (13), said engaging section (11) having an opening (111), grooves (113) opposite to each other being provided respectively on upper and lower sides of said opening (111);
an accessory part (2), being used to combine with said main temple body (1), having a side plate (21) fitted with an embracing portion (22) to turn at the end thereof and further extending forward, said embracing portion (22) being used to interlink correspondingly with said engaging section (11) of said main temple body (1), a second inserting portion (26) being fitted at a place adjacent to said embracing portion (22) and on said side plate (21) for interlinking correspondingly with said engaging slot (12) provided on said temple body (1), a sinus (24) being formed between said embracing portion (22) and said second inserting portion (26) for accommodating said connecting section (13), a first inserting portion (25) being provided between said side plate (21) and said embracing portion (22) for insertion into said opening (111), protrusions (253) being provided respectively at upper and lower sides of one end of said first inserting portion (25) for interlinking correspondingly within said grooves (113).

6. An eyeglass temple as claimed in claim 5, wherein projecting sections (14) are provided on the inner surface of said temple body (1) and on a place adjacent to said engaging section (12), or on the inner surface of said connecting section (13).

7. An eyeglass temple as claimed in claim 5, wherein said engaging slot (12) having a horizontal centerline (H) as the centerline of symmetry of its shape and said second inserting portion (26) having a horizontal centerline (H) as the centerline of symmetry of its shape, so that the accessory part (2) is combined with said main temple body (1).

8. An eyeglass temple as claimed in 7, wherein projecting sections (14) are formed on the inner surface of said main temple body (1) and on the place adjacent to said engaging section (12), or on the inner surface of said connecting section (13).

9. An eyeglass temple, comprising:

a main temple body (1) having an engaging section (11) at its rear end, at least one engaging slot (12) being formed at a place near said engaging section (11), said engaging section (11) and said engaging slot (12) being spaced apart by a connecting section (13), said engaging section (11) having an opening (111) and a post section (114) connected between upper and lower end faces of said opening (111);

an accessory part (2), being used to combine with said main temple body (1), having a side plate (21) fitted with an embracing portion (22) to turn at the end thereof and further extending forward, said embracing portion (22) being used to interlink correspondingly with said engaging section (11) of said main temple body (1), a second inserting portion (26) being fitted at a place adjacent to said embracing portion (22) and on said side plate (21) for interlinking correspondingly with said engaging slot (12) provided on said temple body (1), a sinus (24) being formed between said embracing portion (22) and said second inserting portion (26) for accommodating said connecting section (13), a slit (27) for the interlinking with said post section (114) being provided between said side plate (21) and said embracing portion (22) of said accessory part (2).

10. An eyeglass temple as claimed in claim 9, wherein projecting sections (14) are provided on the inner surface of said main temple body (1) and on a place adjacent to said engaging section (12), or on the inner surface of said connecting section (13).

11. An eyeglass temple as claimed in claim 9, wherein said engaging slot (12) having a horizontal centerline (H) as the centerline of symmetry of its shape and said second inserting portion (26) having a horizontal centerline (H) as the centerline of symmetry of its shape, so that the accessory part (2) is combined with said main temple body (1).

12. An eyeglass temple as claimed in claim 11, wherein projecting sections (14) are formed on the inner surface of said temple body (1) and on a place adjacent to said engaging section (12), or on the inner surface of said connecting section (13).

* * * * *